US011822559B2

(12) United States Patent
Sen et al.

(10) Patent No.: US 11,822,559 B2
(45) Date of Patent: Nov. 21, 2023

(54) HOLOGRAPHIC TOKEN FOR DECENTRALIZED INTERACTIONS

(71) Applicant: Bank of America Corporation, Charlotte, NC (US)

(72) Inventors: Geetika Sen, Maharashtra (IN); Krishna Rangarao Mamadapur, Maharashtra (IN); Durga Prasad Kutthumolu, Telengana (IN)

(73) Assignee: Bank of America Corporation, Charlotte, NC (US)

( * ) Notice: Subject to any disclaimer, the term of this patent is extended or adjusted under 35 U.S.C. 154(b) by 71 days.

(21) Appl. No.: 17/713,435

(22) Filed: Apr. 5, 2022

(65) Prior Publication Data

US 2023/0315740 A1    Oct. 5, 2023

(51) Int. Cl.
| | |
|---|---|
| *G06F 16/2457* | (2019.01) |
| *G06F 16/2455* | (2019.01) |
| *G06F 40/279* | (2020.01) |
| *G10L 15/18* | (2013.01) |
| *G10L 15/30* | (2013.01) |
| *G10L 15/22* | (2006.01) |

(52) U.S. Cl.
CPC .. *G06F 16/24575* (2019.01); *G06F 16/24552* (2019.01); *G06F 40/279* (2020.01); *G10L 15/18* (2013.01); *G10L 15/22* (2013.01); *G10L 15/30* (2013.01)

(58) Field of Classification Search
None
See application file for complete search history.

(56) References Cited

U.S. PATENT DOCUMENTS

| | | |
|---|---|---|
| 11,216,073 B2 | 1/2022 | Klappert et al. |
| 2005/0206920 A1* | 9/2005 | Yamazaki ............... H04N 1/52 358/1.8 |

\* cited by examiner

*Primary Examiner* — Baoquoc N To
(74) *Attorney, Agent, or Firm* — Weiss & Arons LLP

(57) ABSTRACT

Apparatus and methods for generating a holographic structure are provided. The methods may include retrieving datasets stored in an object-based database. Each dataset may store a record of an interaction between a customer and an entity. The methods may include running a first routine and a second routine on the retrieved datasets to generate a holographic token ("HT"). The HT may store user questions and an emotion. In response to an edge gateway receiving a request, from an edge device associated with the customer, to establish a communication session leveraging extended reality capabilities, the methods may include activating a representative device to establish a communication session with the edge device. The methods may also include triggering the representative device to display a holographic structure for viewing via the representative device that includes a facial image displaying the emotion and the subset of the extracted user questions.

20 Claims, 5 Drawing Sheets

HOLOGRAPHIC TOKEN FOR DECENTRALIZED INTERACTIONS

FIELD OF TECHNOLOGY

Aspects of the disclosure relate to generating a holographic token. In particular, aspects of the disclosure relate to leveraging stored interaction data to generate a holographic token.

BACKGROUND

Conventional methods for client-entity interactions include interactive voice response ("IVR") systems and online messaging. In these conventional methods, a customer service representative interacting with a client will start the conversation without having advance knowledge of the client's needs. This lack of knowledge can result in the client being asked questions that were recently answered by the client in a recent client-entity exchange. Additionally, failure to understand the client's needs may result in client frustration and the client feeling not understood.

It would be desirable, therefore, to provide systems and methods for enhancing a customer service representative's understanding of a client's needs immediately at a start of a client-entity interaction to enhance the client's experience and to shorten the time needed to service the client.

The use of holographic displays to view images and enhance communications is rapidly becoming widespread. Edge devices, such as smart phones, smart glasses, headsets, smart watches, etc. are being manufactured to support viewing of holographic images generated by the edge device.

Viewing a holographic image during an interaction can give the feeling of an in-person communication, in contrast to conventional long-distance communication methods such as phone calls and text messaging, which fail to provide visual images. Furthermore, a holographic image can express pictorially what would otherwise require lengthy text.

It would be further desirable, therefore, to provide systems and methods for supporting client-entity interactions via holographic displays. It would be further desirable to generate a holographic display for an agent of the entity that gives the agent preemptive knowledge of the client and the client's needs. It would also be desirable to generate a holographic display for the client that will increase the likelihood of the agent properly servicing the client's needs.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
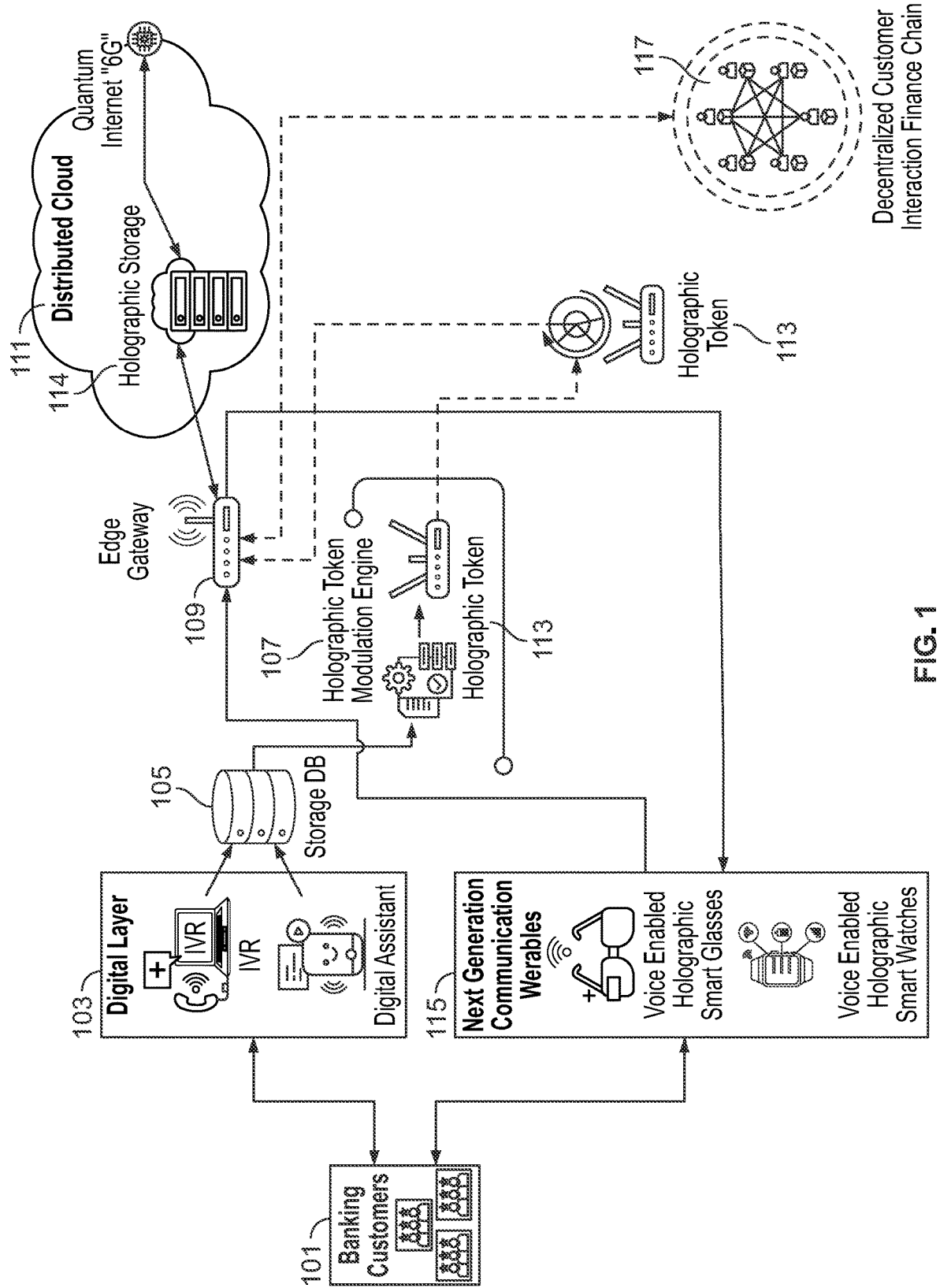
FIG. 1 shows illustrative apparatus and methods in accordance with the invention.

Apparatus and methods for generating a holographic token is provided. The holographic token may include a holographic structure. The holographic structure may display an expected sentiment of a customer stored in the holographic token and may be used by a representative to pre-empt an expected emotional state of the customer to better service the customer's needs. The holographic structure may also include one or more pieces of customer data and/or expected questions that a customer may ask to further augment a representative's ability to service the customer during an interaction. The holographic structure may be generated by a representative device supporting extended reality ("XR") capabilities.

The apparatus and methods may include retrieving datasets stored in an object-based database. Each dataset may store a record of an interaction between a customer and an entity. The interaction may be a phone call between the customer and a representative of the entity via a interactive voice response ("IVR") system. The interaction may be text messages exchanged between the customer and a representative via online chat, SMS, or any other suitable medium. The dataset may store data generated by the IVR system or the online system during the interaction. Exemplary data that may be stored in a dataset may include data detailing electronic selections or keypad selections executed by the customer during an interaction, an intensity at which the selections were made, a tone of voice of the customer when speaking to the representative via the IVR system, or any other suitable conversation data.

Each dataset may be tagged with a date on which the interaction took place. Each dataset may include strings of text. The strings of text may be generated by natural language processing ("NLP") running on an IVR system in response to receiving a user utterance during the interaction. The strings of text may be text messages transmitted from the customer to the representative during the interaction.

The methods may include storing the retrieved datasets. The retrieved datasets may be stored in a database, a cache, a temporary cache, or any other suitable memory. The retrieved datasets may be stored temporarily to be used for creating a holographic token ("HT") as described herein. When the HT is created, the datasets may then be purged from storage.

While the datasets are stored, the methods may include running a first routine and a second routine on the datasets. In some embodiments, the first routine and the second routine may be run in parallel.

The first routine may include running a first set of computer-executable instructions to identify, in the datasets, user questions. Each of the user questions may include one or more predetermined terms. The user questions may be identified using NLP to extract from the strings of text sub-strings that comprise a user question. Sometimes, the sub-string may be the string. The NLP may use semantic meaning, sentence structure, a keyword search, and/or any other suitable methods to identify a user questions.

The one or more predetermined terms may be stored in a rules database. The predetermined terms may be associated with a specific topic. For example, when the entity is a banking entity and the customer is a banking customer, the predetermined terms may be words associated with banking, such as credit, debit, mortgage, payment, loan, etc. Only extracting customer questions that include at least one predetermined term may ensure that the extracted questions are relevant to the entity and may remove false positives— i.e. questions such as "how are you today," "how are you feeling" etc. which are not useful in improving a future interaction between a representative of an entity and the customer.

In some embodiments, all identified user questions may be extracted, without being restricted to user questions including at least one predetermined term.

The methods may include transmitting the identified user questions to a machine learning algorithm. The methods may also include receiving from the machine learning algorithm a subset of the user questions.

The methods may also include training the machine learning algorithm to prioritize user questions for including in the subset of the user questions. The training may include feeding the machine learning algorithm a plurality of customer questions, each of the plurality of customer questions being classified as an important question or a non-important question. The machine learning algorithm may then use this training data to create an algorithm to identify, from a new input group of questions, which questions to output in a subset of user questions. In some of these embodiments, questions identified as 'important' may be included in the subset of user questions.

The second routine may include executing a query by running a second set of computer-executable instructions. The query may be run on all datasets tagged with a date not earlier than a predetermined date. The predetermined data may be a certain number of months before a current date on which the query is being run. For example, the predetermined date may be 1 week, 2 weeks, 1 month, 2 months, 3 months, or any other suitable timespan before a date on which a query is being run. The query may be run to extract keywords from the datasets which meet the time-based requirements. Each keyword may be associated with a positive emotion a negative emotion. The keywords may be stored in the rules database. The keywords may be stored in a database different from the rules database. A weight associated with each keyword may also be stored in the database.

The methods may include assigning a weight to each extracted keyword. The assigned weight may be the weight stored in the rules database. For example, a keyword such as 'good' that is associated with a positive emotion may be assigned weight one, and a keyword such as 'amazing' that is associated with a positive emotion may be assigned weight two greater than weight one. As such, the greater positive emotion that a keyword demonstrates, the greater the weight that may be assigned to that keyword. Similarly, the greater negative emotion that a keyword demonstrates, the greater the weight that may be assigned to that keyword.

The methods may include computing a first weight of weighted keywords associated with a positive emotion and computing a second weight of weighted keywords associated with a negative emotion.

Upon completion of the first routine and the second routine, the methods may include generating a holographic token ("HT"). The HT may be a dataset, a data packet or a data object. The HT may be associated with identifying information that identifies the customer, such as a customer bank account number, a customer name and date of birth, or any other suitable piece of customer data. The HT may store the subset of the user questions and an emotion. The emotion may be the positive emotion when the first weight is greater than the second weight. The emotion may be the negative emotion when the second weight is greater than the first weight. The HT may store a holographic structure.

The methods may include routing the HT via an edge gateway to a distributed cloud storage database. The methods may include storing the HT in the distributed cloud database.

In response to receiving a request, from an edge device associated with the customer, to establish a communication session including the generation of holographic displays, the methods may include pulling the HT associated with the customer from the distributed cloud storage database and routing the request and the HT to a representative device supporting extended reality capabilities. Information included in the request from the edge device may be stored in an entity database and associated with the customer, such as an IP address of the edge device, a telephone number of the edge device, or any other suitable identifying information.

The edge device and/or the representative device may be a smartphone paired to a headset that can generate XR images including holographic images, an XR headset with internet connection, or any other suitable XR device. In some embodiments, the edge device may not support XR viewing. For example, the edge device may be a phone such as a dumb phone or a smart phone, a computing device for establishing a chat session with the representative, or any other suitable device.

The methods may include instructing the representative device to establish a communication session with the edge device. The methods may also include instructing the representative device to generate a holographic structure for viewing via the representative device. As such, a representative using/wearing the representative device may view the holographic structure.

The holographic structure stored in the HT may include a facial image displaying the emotion stored in the HT. The HT may include instructions for generating the holographic structure. The facial image may be displayed on an avatar. The facial image may or may not include portions of the body from below the chin or neck. The holographic structure may also include displaying the subset of the user questions stored in the HT. The subset of the user questions may be positioned about, around, in proximity to, or away from the facial image. As such, a representative using the representative device may, upon connection to the customer's device, immediately view a visual representation of the customer's expected emotional state in addition to questions that the customer may be asking. This may enable the representative to be better prepared for the call and to address the customer's needs quickly and efficiently.

In some embodiments, the generating of the HT may also include storing in the HT a customer name, a customer date of birth, and one or more pieces of customer data. The one or more pieces of customer data may be identified by processing the subset of the user questions. The processing may identify potentially useful information for answering the subset of the user questions. For example, if the subset of the user questions includes a question of "what is my mortgage payment" the processing may pull the customer's monthly mortgage payment amount and add this piece of data to the HT. In some of these embodiments, the holographic structure may include displaying the customer data. As such, the displaying of the holographic structure may include displaying the customer name, the customer date of birth and the one or more pieces of customer data in the holographic structure viewed by the representative via the representative device.

The methods may include, after the establishing of the communication session between the representative device and the edge device, using lightweight processing to maintain or update the emotion displayed on the facial image. The lightweight processing may include monitoring input received by the representative device from the edge device for high-action keywords. Each high-action keyword may be associated with a positive emotion or a negative emotion. Each high-action keyword may be assigned a weight above a threshold value in the rules database. For example, a high-action keyword may be a strong positive or negative statement, such as love, hate, furious, thrilled, etc.

Failure to identify, during the lightweight processing, one of the high-action keywords may result in the representative device maintaining of the emotion displayed on the facial image.

Identifying, during the lightweight processing, one of the high-action keywords associated with an emotion different from the emotion displayed on the facial image may trigger the representative device to update the facial image to display the emotion associated with the high-action keyword. Identifying, during the lightweight processing, one of the high-action keywords associated with an emotion that is the same emotion displayed on the facial image may result in the representative device maintaining of the emotion displayed on the facial image.

As such, the lightweight processing may use a subset of the keywords stored in the rules database to determine whether to update the facial image. The using of the subset of the keywords may result in a smaller processing overhead in contrast to using all the keywords stored in the rules database, which could require continuously or periodically calculating a weight of emotions associated with the keywords to determine whether to update the emotion on the facial image.

In some embodiments, the high-action keywords may be stored in a first dataset and the keywords used by the query may be stored in a second dataset. The first data set may be smaller than the second dataset.

In some embodiments, the representative device may store data generated during the communication session between the representative device and the edge device. Upon termination of the communication session, the representative device may transmit the stored data to the object-based database. The object-based database may store the data as a new dataset. The methods may include, in response to the storing of the new dataset in the object-based database, retrieving the datasets including the new dataset stored in the object-based database and re-running the first and second routines to generate a new HT. The methods may include overwriting the HT stored in the distributed cloud storage database with the new HT and using the new HT for a future communication between a customer edge device and a representative device.

In some embodiments, if the emotion is a positive emotion, no HT may be generated. When no HT is generated for a customer, a communication session between the customer edge device and a representative device may not include the generating of a holographic structure by a representative device.

The method steps executed by the systems and methods of the invention may include computer-executable instructions running on a computing device. A holographic token modulation engine running on a computing device may be used to retrieve the datasets, process them using the first and second routines, build the HT, transmit the HT to the distributed cloud and later retrieve the HT and establish the communication session and give instructions to the representative device. The holographic token modulation engine may include apparatus illustrated in FIGS. 4 and 5 to execute the methods described herein.

The systems and methods of the invention may include, upon completion of the first routine and the second routine, generating both the HT as described herein and generating a second HT token. The HT described above may be referred to alternately herein as a first HT. The second HT may store a three-dimensional image for viewing by the customer.

The three-dimensional image may be associated with the emotion included in the first HT. When the emotion is a positive emotion, the three-dimensional display may be a first three-dimensional display. When the emotion is a negative emotion, the three-dimensional display may be a second three-dimensional display. For example, when the emotion is a positive emotion, the first three-dimensional image may be a scene of a banking institution. When the emotion is a negative emotion, the second three-dimensional image may instead be a relaxing scene at a park, the waterfront, or any other soothing image.

In some of these embodiments, the methods may include routing the first HT and the second HT via the edge gateway to the distributed cloud storage database. The methods may also include, in response receiving the request from the edge device to establish a communication session, pulling the first HT and the second HT from the distributed cloud storage database. The methods may further include routing the request and the first HT to the representative device and instructing the representative device to establish a communication session with the edge device and to generate a holographic structure for viewing, the holographic structure including a facial image displaying the emotion stored in the first HT and the subset of the user questions stored in the first HT. The methods may further include transmitting the second HT to the edge device and instructing the edge device to generate a three-dimensional display including the three-dimensional image.

When two HTs are generated, the processing may include, in response to the storing of the new dataset in the object-based database, retrieving the datasets including the new dataset stored in the object-based database and re-running the first and second routines to generate a new first HT and a new second HT.

The systems and methods of the invention may include, after the generating of the HT, receiving a request from a customer mobile phone or a customer online banking portal to establish a communication session. In some of these embodiments, the methods may include pulling the HT from the distributed cloud storage database and routing the request and the HT to a representative device supporting extended reality capabilities. The methods may also include instructing the representative device to establish a communication session with the customer mobile phone or the customer online banking portal and to generate the holographic structure for viewing via the representative device as described herein.

In some of these embodiments, the methods may include executing the lightweight processing described herein after the establishing of the communication session between the representative device and the customer mobile phone or the customer online banking portal. The lightweight processing may include maintaining or updating the emotion displayed on the facial image by monitoring input received by the representative device from the customer mobile phone or the customer online banking portal for high-action keywords as described herein.

In some embodiments, the representative device may store data generated during the communication session between the representative device and the customer mobile phone or the customer online banking portal and, upon termination of the communication session, transmitting the stored data to the object-based database to be stored as a new dataset.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or programs or by utilizing computer-readable data structures.

FIG. 1 shows exemplary apparatus and methods in accordance with the invention. In FIG. 1, customers, such as banking customers 101, may use digital layer 103, such as IVR or voice assistants, for their daily communication needs. Conversations generated using digital layer 103 between banking customer 101 and an entity such as a bank may be recorded in datasets stored in database 105 as described herein. Database 105 may be the object-based database. Holographic token modulation engine 107 may use datasets stored in database 105 to generate holographic token 113 as described herein. Holographic token 113 may be sent to edge gateway 109 to be stored in distributed cloud 111. Distributed cloud 111 may store holographic token 113 in holographic storage 114. Quantum internet 6G may be used to transmit and/or store holographic token 113.

In FIG. 1, banking customers 101 may leverage next generation communication wearables 115 as a communication channel to connect to decentralized customer interaction finance chain 117. Next generation communication wearables 115 may include voice enabled holographic smart glasses, voice enabled holographic headsets, voice enabled holographic smart watches and/or any other suitable devices. Decentralized customer interaction finance chain 117 may include one or more representatives and representative devices used by the representatives.

One of banking customers 101 may initiate a communication session with decentralized customer interaction finance chain 117. The communication session may be initiated by transmitting a request to edge gateway 109. Edge gateway 109 may retrieve from holographic storage 114 holographic token 113 associated with the one of banking customers 101 and transmit holographic token 113 to a representative in customer interaction finance chain 117. Edge gateway 109 may also establish a communication session between the one of banking customers 101 and a representative in customer interaction finance chain 117. A next generation communication wearable—i.e. a representative device—associated with the representative may receive holographic token 113 and use data stored in holographic token 113 to generate a holographic structure for the representative to view concurrently with the initiation of the communication session.

Figure 2:
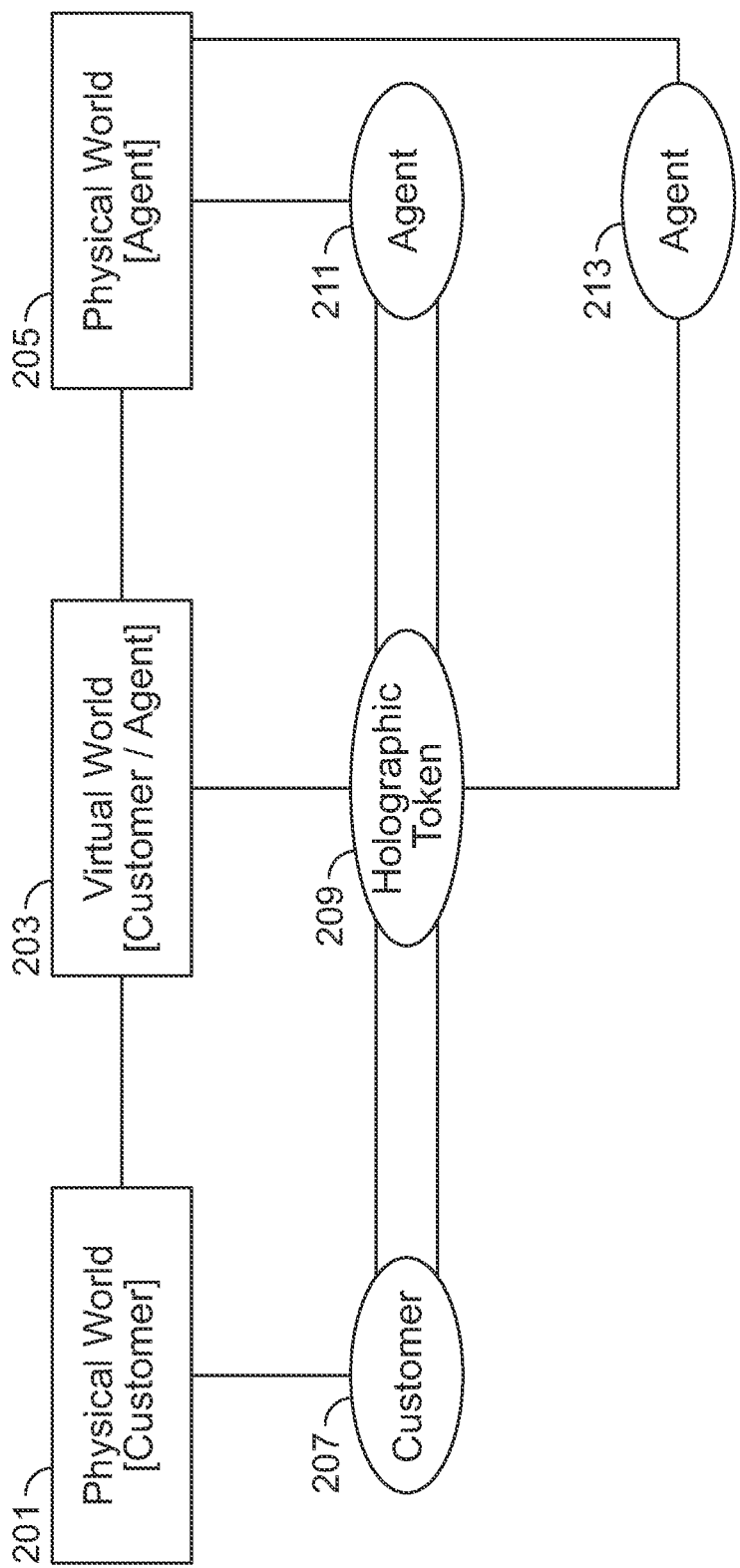
FIG. 2 shows illustrative apparatus and methods in accordance with the invention.

FIG. 2 shows an exemplary system in accordance with the invention. In the system, interactions between a customer physical word 201 and an agent physical world 205 connect via a customer/agent virtual world 203. Specifically, customer 207 and one or more of agent 211 and agent 213 are illustrated as interacting via holographic token 209.

Figure 3:
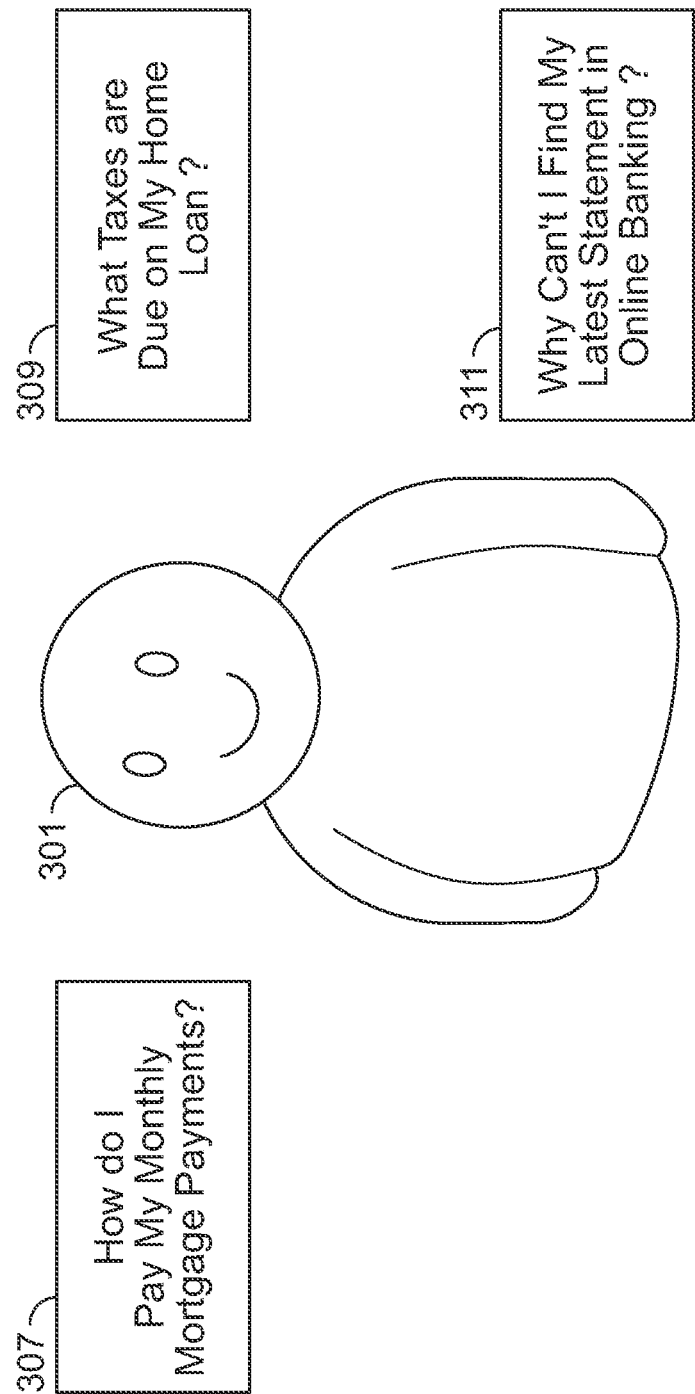
FIG. 3 shows an illustrative holographic structure generated in accordance with the invention.

FIG. 3 shows an exemplary holographic structure generated by a representative device in accordance with the systems and methods of the invention. The holographic structure may be generated by the representative device using data and instructions stored in a holographic token as described herein. The holographic structure may include facial image 301 showing a positive emotion. The holographic structure may also include customer information 303 and 305. Customer information 303 may include a name of a customer and a most recent data that the customer contacted a banking institution. Customer information 305 may include a date when the customer closed on a home loan with the banking institution.

The holographic structure may also include the subset of customer questions. The subset of customer questions may include question 307, question 309 and question 311. Question 307 may state "How do I pay my monthly mortgage payments?" Question 309 may state "What taxes are due on my home loan?" Question 311 may state "Why can't I find my latest statement in online banking?"

The holographic structure illustrated in FIG. 3 may be viewed by a banking representative when the banking representative initiates a contact session with the customer. Viewing the holographic structure may provide the banking representative with a panoramic view of the customer's anticipated emotion, questions that the customer may ask, and information that may be helpful to the representative during the contact session, to enhance the customer's call experience.

Figure 4:
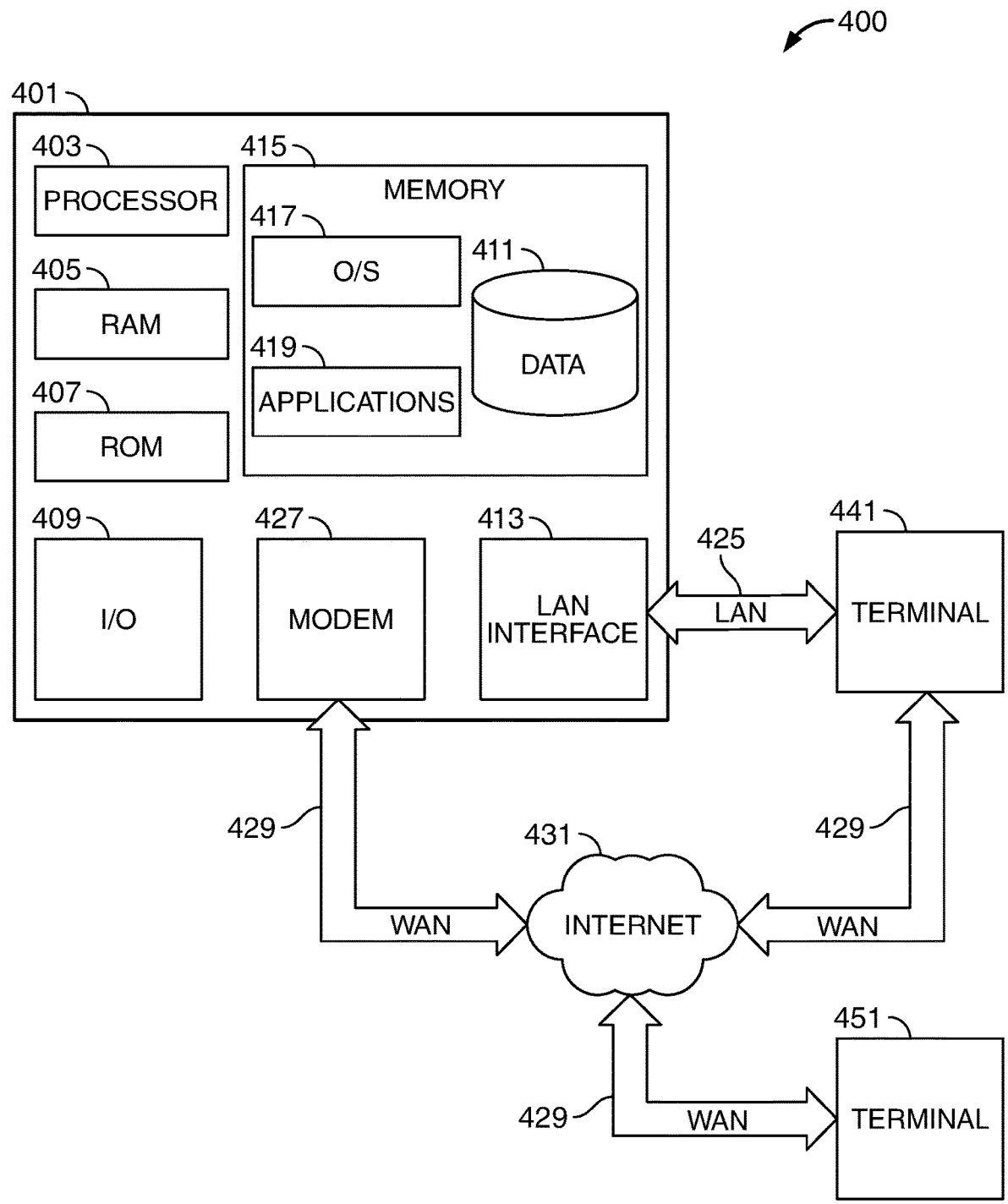
FIG. 4 shows illustrative block diagram of apparatus in accordance with the invention.

FIG. 4 shows an illustrative block diagram of system 400 that includes computer 401. Computer 401 may alternatively be referred to herein as an "engine," "server" or a "computing device." Computer 401 may be a workstation, desktop, laptop, tablet, smart phone, or any other suitable computing device. Elements of system 400, including computer 401, may be used to implement various aspects of the systems and methods disclosed herein. Each of the apparatus illustrated in FIG. 1, including holographic token modulation engine, digital layer 103, next generation communication wearables 115, storage database 105, edge gateway 109, distributed cloud 111, holographic storage 114 and/or decentralized customer interaction finance chin 117 may include some or all of the elements and apparatus of system 400.

Computer 401 may have a processor 403 for controlling the operation of the device and its associated components, and may include RAM 405, ROM 407, input/output circuit 409, and a non-transitory or non-volatile memory 415. Machine-readable memory may be configured to store information in machine-readable data structures. The processor 403 may also execute all software running on the computer—e.g., the operating system and/or voice recognition software. Other components commonly used for computers, such as EEPROM or Flash memory or any other suitable components, may also be part of the computer 401.

The memory 415 may be comprised of any suitable permanent storage technology—e.g., a hard drive. The memory 415 may store software including the operating system 417 and application(s) 419 along with any data 411 needed for the operation of computer 401. Memory 415 may also store videos, text, and/or audio assistance files. The data stored in Memory 415 may also be stored in cache memory, or any other suitable memory.

Input/output ("I/O") module 409 may include connectivity to a microphone, keyboard, touch screen, mouse, and/or stylus through which input may be provided into computer 401. The input may include input relating to cursor movement. The input/output module may also include one or more speakers for providing audio output and a video display device for providing textual, audio, audiovisual, and/or graphical output. The input and output may be related to computer application functionality.

Computer 401 may be connected to other systems via a local area network (LAN) interface 413. Computer 401 may operate in a networked environment supporting connections to one or more remote computers, such as terminals 441 and 451. Terminals 441 and 451 may be personal computers or servers that include many or all of the elements described above relative to computer 401. The network connections depicted in FIG. 4 include a local area network (LAN) 425 and a wide area network (WAN) 429, but may also include other networks. When used in a LAN networking environment, computer 401 is connected to LAN 425 through a LAN interface 413 or an adapter. When used in a WAN networking environment, computer 401 may include a modem 427 or other means for establishing communications over WAN 429, such as Internet 431. Connections between Computer 401 and Terminals 451 and/or 441 may be used for connections between the holographic token modulation engine 113 and database 105, distributed cloud 115, next generation communication wearable 115, digital layer 103, decentralized customer interaction finance chain 117, and any other connections described herein.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or API. Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 419, which may be used by computer 401, may include computer executable instructions for invoking functionality related to communication, such as e-mail, Short Message Service (SMS), and voice input and speech recognition applications. Application program(s) 419 (which may be alternatively referred to herein as "plugins," "applications," or "apps") may include computer executable instructions for invoking functionality related to performing various tasks. Application programs 419 may utilize one or more algorithms that process received executable instructions, perform power management routines or other suitable tasks. Application programs 419 may utilize one or more decisioning processes such as the first routine and the second routine to generate the HT and, in some embodiments, the first HT and the second HT as described herein. Application programs 419 may also be used to perform the lightweight processing described herein.

Application program(s) 419 may include computer executable instructions (alternatively referred to as "programs"). The computer executable instructions may be embodied in hardware or firmware (not shown). The computer 401 may execute the instructions embodied by the application program(s) 419 to perform various functions.

Application program(s) 419 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 411, and any other suitable information, may be stored in memory 415. One or more of applications 419 may include one or more algorithms that may be used to implement features of the disclosure such as the processing and routing of datasets from the object-based database to the temporary cache, and the routing of HT tokens to and from the distributed cloud storage database.

The invention may be described in the context of computer-executable instructions, such as applications 419, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 401 and/or terminals 441 and 451 may also include various other components, such as a battery, speaker, and/or antennas (not shown). Components of computer system 401 may be linked by a system bus, wirelessly or by other suitable interconnections. Components of computer system 401 may be present on one or more circuit boards. In some embodiments, the components may be integrated into a single chip. The chip may be silicon-based.

Terminal 451 and/or terminal 441 may be portable devices such as a laptop, cell phone, Blackberry™, tablet, smartphone, or any other computing system for receiving, storing, transmitting and/or displaying relevant information. Terminal 451 and/or terminal 441 may be one or more user devices, such as an XR-enabled headset. Terminals 451 and 441 may be identical to computer 401 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smart phones, multiprocessor systems, microprocessor-based systems, cloud-based systems, programmable consumer electronics, network PCs, minicomputers, mainframe computers, distributed computing environments that include any of the above systems or devices, and the like. Some or more of the computing system environments or configurations may generate three-dimensional images using XR such as holographic images.

Figure 5:
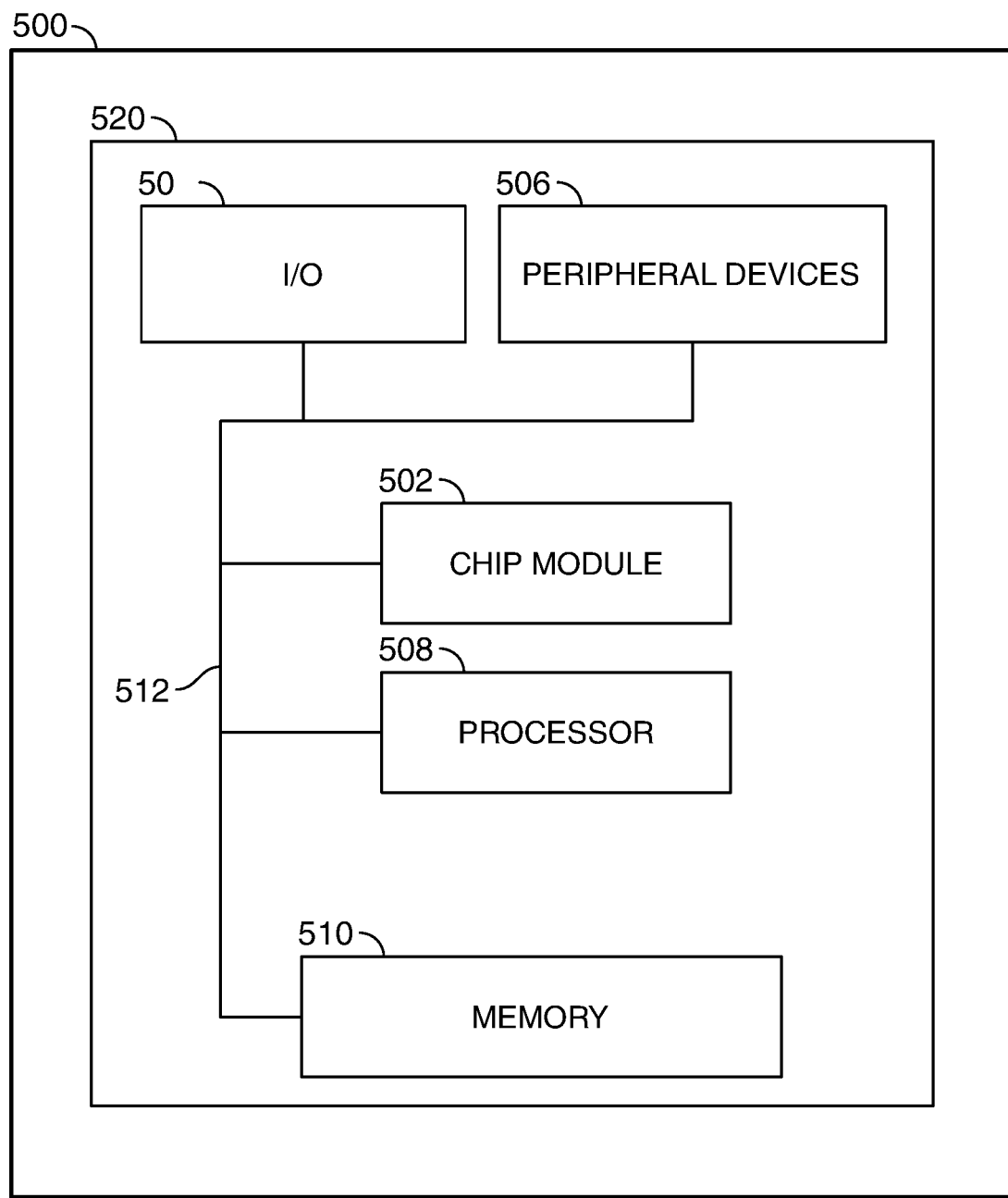
FIG. 5 shows illustrative apparatus that may be configured in accordance with the invention.

FIG. 5 shows illustrative apparatus 500 that may be configured in accordance with the principles of the disclosure. Apparatus 500 may be a computing device. Apparatus 500 may include one or more features of the apparatus shown in FIG. 4. Apparatus 500 may include chip module 502, which may include one or more integrated circuits, and which may include logic configured to perform any other suitable logical operations.

Apparatus 500 may include one or more of the following components: I/O circuitry 504, which may include a transmitter device and a receiver device and may interface with fiber optic cable, coaxial cable, telephone lines, wireless devices, PHY layer hardware, a keypad/display control device or any other suitable media or devices; peripheral devices 506, which may include counter timers, real-time timers, power-on reset generators or any other suitable peripheral devices; logical processing device 508, which may compute data structural information and structural parameters of the data; and machine-readable memory 510.

Machine-readable memory 510 may be configured to store in machine-readable data structures: machine executable instructions, (which may be alternatively referred to herein as "computer instructions" or "computer code"), applications such as applications 419, signals, and/or any other suitable information or data structures.

Components 502, 504, 506, 508 and 510 may be coupled together by a system bus or other interconnections 512 and may be present on one or more circuit boards such as circuit board 520. In some embodiments, the components may be integrated into a single chip. The chip may be silicon-based.

Thus, systems and methods for generating holographic structures are provided. Persons skilled in the art will appreciate that the present invention can be practiced by other than the described embodiments, which are presented for purposes of illustration rather than of limitation.

What is claimed is:

1. A method for generating a holographic structure, the method comprising:
retrieving datasets stored in an object-based database, each dataset storing a record of an interaction between a customer and an entity, being tagged with a date on which the interaction took place, and including strings of text;
storing the retrieved datasets in a temporary cache;
running a first routine and a second routine on the datasets stored in the temporary cache, wherein:
the first routine comprises identifying, in the datasets, user questions including one or more predetermined terms, transmitting the identified user questions to a machine learning algorithm, and receiving from the machine learning algorithm a subset of the user questions; and
the second routine comprises:
running a query, on all datasets tagged with the date not earlier than a predetermined date, to extract keywords, each keyword being associated with either a positive emotion a negative emotion;
assigning a weight to each extracted keyword; and
computing a first weight of weighted keywords associated with a positive emotion and computing a second weight of weighted keywords associated with a negative emotion;
generating a holographic token ("HT") upon completion of the first routine and the second routine, the HT storing the subset of the user questions and an emotion, the emotion being a positive emotion when the first weight is greater than the second weight, and the emotion being a negative emotion when the second weight is greater than the first weight;
routing the HT via an edge gateway to a distributed cloud storage database; and
in response to receiving a request, from an edge device associated with the customer, to establish a communication session including the generation of holographic displays:
pulling the HT from the distributed cloud storage database and routing the request and the HT to a representative device supporting extended reality capabilities; and
instructing the representative device to establish a communication session with the edge device and to generate a holographic structure for viewing via the representative device, the holographic structure including:
a facial image displaying the emotion stored in the HT; and
the subset of the user questions stored in the HT.

2. The method of claim 1 wherein one or more of the datasets store data detailing electronic selections executed by the customer during an interaction.

3. The method of claim 1 wherein each string of text is generated by natural language processing running on an interactive voice response ("IVR") system in response to receiving a user utterance.

4. The method of claim 1 wherein the first routine and the second routine are run in parallel.

5. The method of claim 1 wherein each of the one or more predetermined terms are stored in a rules database and are associated with a first term.

6. The method of claim 1 further comprising training the machine learning algorithm to prioritize user questions for including in the subset of the user questions, the training including feeding the machine learning algorithm with a plurality of customer questions, each of the plurality of customer questions being classified as an important question or a non-important question.

7. The method of claim 1 wherein the generating of the HT further includes storing in the HT a customer name, a customer date of birth, and one or more pieces of customer data, wherein:

the one or more pieces of customer data are identified by processing the subset of the user questions, the processing identifying potentially useful information for answering the subset of the user questions.

8. The method of claim 7 wherein the displaying of the holographic structure further includes displaying the customer name, the customer date of birth and the one or more pieces of customer data.

9. The method of claim 1 further comprising, after the establishing of the communication session between the representative device and the edge device:

using lightweight processing to maintain or update the emotion displayed on the facial image, the lightweight processing monitoring input received by the representative device from the edge device for high-action keywords, each high-action keyword being associated with a positive emotion or a negative emotion;

failure to identify one of the high-action keywords results in the representative device maintaining of the emotion displayed on the facial image; and identifying one of the high-action keywords associated with an emotion different from the emotion displayed on the facial image triggers the representative device to update the facial image to display the emotion associated with the high-action keyword; wherein:

the high-action keywords are stored in a first dataset;
the keywords used by the query are stored in a second dataset; and
the first data set is smaller than the second dataset.

10. The method of claim 9 further comprising the representative device storing data generated during the communication session between the representative device and the edge device and, upon termination of the communication session, transmitting the stored data to the object-based database to be stored as a new dataset.

11. The method of claim 10 further comprising, in response to the storing of the new dataset in the object-based database, retrieving the datasets including the new dataset stored in the object-based database and re-running the first and second routines to generate a new HT.

12. A method for generating a holographic structure, the method comprising:

retrieving datasets stored in an object-based database, each dataset storing a record of an interaction between a customer and an entity, being tagged with a date on which the interaction took place, and including strings of text;

storing the retrieved datasets in a temporary cache;

running a first routine and a second routine on the datasets stored in the temporary cache, wherein:

the first routine comprises identifying, in the datasets, user questions including one or more predetermined terms, transmitting the identified user questions to a machine learning algorithm, and receiving from the machine learning algorithm a subset of the user questions; and the second routine comprises:

running a query, on all datasets tagged with the date not earlier than a predetermined date, to extract keywords, each keyword being associated with either a positive emotion a negative emotion;

assigning a weight to each extracted keyword; and computing a first weight of weighted keywords associated with a positive emotion and computing a second weight of weighted keywords associated with a negative emotion;

upon completion of the first routine and the second routine, generating:

a first holographic token ("HT"), the first HT storing the subset of the user questions and an emotion, the emotion being a positive emotion when the first weight is greater than the second weight, and the emotion being a negative emotion when the second weight is greater than the first weight; and a second HT storing a three-dimensional image for viewing by the customer, the three-dimensional image being associated with the emotion;

routing the first HT and the second HT via an edge gateway to a distributed cloud storage database; and in response receiving a request, from an edge device associated with the customer, to establish a communication session including the generation of holographic displays:

pulling the first HT and the second HT from the distributed cloud storage database;

routing the request and the first HT to a representative device supporting extended reality capabilities and instructing the representative device to establish a communication session with the edge device and to generate a holographic structure for viewing, the holographic structure including:

a facial image displaying the emotion stored in the first HT; and the subset of the user questions stored in the first HT; and transmitting the second HT to the edge device and instructing the edge device to generate a three-dimensional display including the three-dimensional image.

13. The method of claim 12 wherein, when the emotion is a positive emotion, the three-dimensional display is a first three-dimensional display, and, when the emotion is a negative emotion, the three-dimensional display is a second three-dimensional display.

14. The method of claim 12 further comprising, after the establishing of the communication session between the representative device and the edge device:

using lightweight processing to maintain or update the emotion displayed on the facial image, the lightweight processing monitoring input received by the representative device from the edge device for high-action keywords, each high-action keyword being associated with a positive emotion or a negative emotion;

failure to identify one of the high-action keywords results in the representative device maintaining of the emotion displayed on the facial image; and identifying one of the high-action keywords associated with an emotion different from the emotion displayed on the facial image triggers the representative device to update the facial image to display the emotion associated with the high-action keyword; wherein:

the high-action keywords are stored in a first dataset;
the keywords used by the query are stored in a second dataset; and
the first data set is smaller than the second dataset.

15. The method of claim 14 further comprising the representative device storing data generated during the communication session between the representative device and the edge device and, upon termination of the communication session, transmitting the stored data to the object-based database to be stored as a new dataset.

16. The method of claim 15 further comprising, in response to the storing of the new dataset in the object-based database, retrieving the datasets including the new dataset stored in the object-based database and re-running the first and second routines to generate a new first HT and a new second HT.

17. A method for generating a holographic structure, the method comprising:
   retrieving datasets stored in an object-based database, each dataset storing a record of an interaction between a customer and an entity, being tagged with a date on which the interaction took place, and including strings of text;
   storing the retrieved datasets in a temporary cache;
   running a first routine and a second routine on the datasets stored in the temporary cache, wherein:
      the first routine comprises identifying, in the datasets, user questions including one or more predetermined terms, transmitting the identified user questions to a machine learning algorithm, and receiving from the machine learning algorithm a subset of the user questions; and
      the second routine comprises:
         running a query, on all datasets tagged with the date not earlier than a predetermined date, to extract keywords, each keyword being associated with either a positive emotion a negative emotion;
         assigning a weight to each extracted keyword; and
         computing a first weight of weighted keywords associated with a positive emotion and computing a second weight of weighted keywords associated with a negative emotion;
   generating a holographic token ("HT") upon completion of the first routine and the second routine, the HT storing the subset of the user questions and an emotion, the emotion being a positive emotion when the first weight is greater than the second weight, and the emotion being a negative emotion when the second weight is greater than the first weight;
   routing the HT via an edge gateway to a distributed cloud storage database; and
   in response to receiving a request, from a customer mobile phone or a customer online portal, to establish a communication session:
      pulling the HT from the distributed cloud storage database and routing the request and the HT to a representative device supporting extended reality capabilities; and
      instructing the representative device to establish a communication session with the customer mobile phone or the customer online portal and to generate a holographic structure for viewing via the representative device, the holographic structure including:
         a facial image displaying the emotion stored in the HT; and
         the subset of the user questions stored in the HT.

18. The method of claim 17 further comprising, after the establishing of the communication session between the representative device and the customer mobile phone or the customer online portal:
   using lightweight processing to maintain or update the emotion displayed on the facial image, the lightweight processing monitoring input received by the representative device from the customer mobile phone or the customer online portal for high-action keywords, each high-action keyword being associated with a positive emotion or a negative emotion;
   failure to identify one of the high-action keywords results in the representative device maintaining of the emotion displayed on the facial image; and
   identifying one of the high-action keywords associated with an emotion different from the emotion displayed on the facial image triggers the representative device to update the facial image to display the emotion associated with the high-action keyword; wherein:
      the high-action keywords are stored in a first dataset;
      the keywords used by the query are stored in a second dataset; and
      the first data set is smaller than the second dataset.

19. The method of claim 18 further comprising the representative device storing data generated during the communication session between the representative device and the customer mobile phone or the customer online portal and, upon termination of the communication session, transmitting the stored data to the object-based database to be stored as a new dataset.

20. The method of claim 19 further comprising, in response to the storing of the new dataset in the object-based database, retrieving the datasets including the new dataset stored in the object-based database and re-running the first and second routines to generate a new HT.

* * * * *